United States Patent [19]

Matsuura

[11] Patent Number: 5,007,692
[45] Date of Patent: Apr. 16, 1991

[54] LASER BEAM SCANNING SYSTEM
[75] Inventor: Kazuo Matsuura, Osaka, Japan
[73] Assignee: Minolta Camera Kabushiki Kaisha, Osaka, Japan
[21] Appl. No.: 455,598
[22] Filed: Dec. 21, 1989
[30] Foreign Application Priority Data Dec. 29, 1988 [JP] Japan .................. 63-334762

[51] Int. Cl.⁵ .................. G02B 26/08; H01J 3/14
[52] U.S. Cl. .................. 350/6.8; 250/236
[58] Field of Search .................. 350/6.1–6.9, 350/394, 396, 401, 388, 392, 380; 250/236

[56] References Cited

U.S. PATENT DOCUMENTS

| | | | |
|---|---|---|---|
| 4,408,826 | 10/1983 | Ike | 350/6.8 |
| 4,607,917 | 8/1986 | Ebner et al. | 350/392 |
| 4,707,081 | 11/1987 | Mir | 350/388 |
| 4,962,312 | 10/1990 | Matuura et al. | 250/236 |

FOREIGN PATENT DOCUMENTS 60-32019 2/1985 Japan .
60-201319 10/1985 Japan .

Primary Examiner—Bruce Y. Arnold
Assistant Examiner—James Phan
Attorney, Agent, or Firm—Price, Gess & Ubell

[57] ABSTRACT

For tracing two scanning paths with a single laser beam, a laser beam scanning system comprises a laser beam source radiating a laser beam, a collimator lens unit, a PLZT element for rotating the polarized direction of the laser beam over 90 degrees, a polygonal mirror causing the laser beam to sweep in a lateral direction, a scanning lens unit for regulating the liner velocity of sweeping motion, a polarization beam splitter transmitting or deflecting the laser beam toward a first destination depending upon the polarized direction and a reflective mirror directing the laser beam transmitted from the beam splitter to a second destination, and the PLZT element is applied with a biasing voltage at every second scanning motion for the rotation of the polarized direction, so that the laser beam rapidly changes the scanning path.

10 Claims, 3 Drawing Sheets

LASER BEAM SCANNING SYSTEM

FIELD OF THE INVENTION

This invention relates to a laser beam scanning system incorporated in, for example, a laser printer or a facsimile.

DESCRIPTION OF THE RELATED ART

Conventionally, a laser printer is equipped with a scanning unit for reproducing a multi-color image, and the scanning unit has a plurality of laser beam sources each reproducing an image of a different component color from each other.

An example of a scanning unit is disclosed in Japanese patent application laid-open (Kokai) No. 60-201319, and comprises a plurality of laser beam sources for radiating laser beams different in wavelength from one another. These laser beams are composed into a single beam, and the composite beam is deflected by using a single deflection-scanner for scanning. After the deflection, the component beams are separated from the composite beam through a filter element of the type having a selectivity in wavelength, and the component beams are directed to respective target spots.

Another prior art example is disclosed in Japanese patent application laid-open No. 60-32019, and produces two laser beams linearly polarized in respective directions perpendicular to each other. In this scanning unit, these beams are also composed into a single beam which is, then, incident into a single deflection-scanner. After the deflection, the single composite beam is separated into the two component beams through a polarized beam splitter, and the component beams are respectively directed to the target spots.

However, each of the scanning units disclosed in the Japanese laid-open patent applications require a plurality laser beam sources equal in number to the laser beams used, and corresponding driving circuits are provided in association with the plural laser beam sources, respectively. For this reason, the scanning unit tends to be enlarged in size, and suffers from a high production cost. Moreover, the plural laser beam sources independently request regulative operations, and, accordingly, must be accompanied with respective regulators. This results a complicated structure further causative of increasing the production cost.

SUMMARY OF THE INVENTION

It is therefore an important object of the present invention to provide a laser beam scanning system which is capable of scanning a plurality of stations by using laser beams radiated from a small number of laser beam sources.

In accordance with one aspect of the present invention, there is provided a laser beam scanning system comprising, laser beam generating means for generating a a laser beam linearly polarized, electro-optical means for selectively varying the polarized direction of the laser beam generated from said laser beam generating means, scanning means for scanning first and second laser beam receiving stations with the laser beam as passed through said electro-optical means, and means for directing the laser beam of which the polarized direction has been varied by the electro-optical means to the first beam receiving station and for directing the laser beam which the polarized direction has not been varied to the second beam receiving station.

In accordance with another aspect of the present invention, there is provided a laser beam scanning apparatus comprising, a laser diode for generating an original laser beam having a specific polarized direction, an electro-optical element for selectively converting the original laser beam to a polarized laser beam which has a polarized direction rotated from the specific polarized direction by 90 degrees, a rotational polygonal mirror for reflecting the original and polarized laser beams toward first and second beam receiving stations, and an optical member for directing the polarized laser beam to the first beam receiving station and for directing the original laser beam to the second laser beam station.

In accordance with still another aspect of the present invention there is provided a method for scanning the first and second laser beam receiving stations with a laser beam, the steps comprising, generating an original laser beam having a specific polarized direction, selectively converting the original laser beam to a polarized laser beam having a polarized direction varied from the specific polarized direction, directing the polarized laser beam to the first beam receiving station in order to scan there, and directing the original laser beam to the second laser beam receiving station in order to scan there.

BRIEF DESCRIPTION OF THE DRAWINGS

The features and advantages of a laser beam scanning system according to the present invention will be more clearly understood from the following description taken in conjunction with the accompanying drawings in which.

DESCRIPTION OF THE PREFERRED EMBODIMENT

Figure 1:
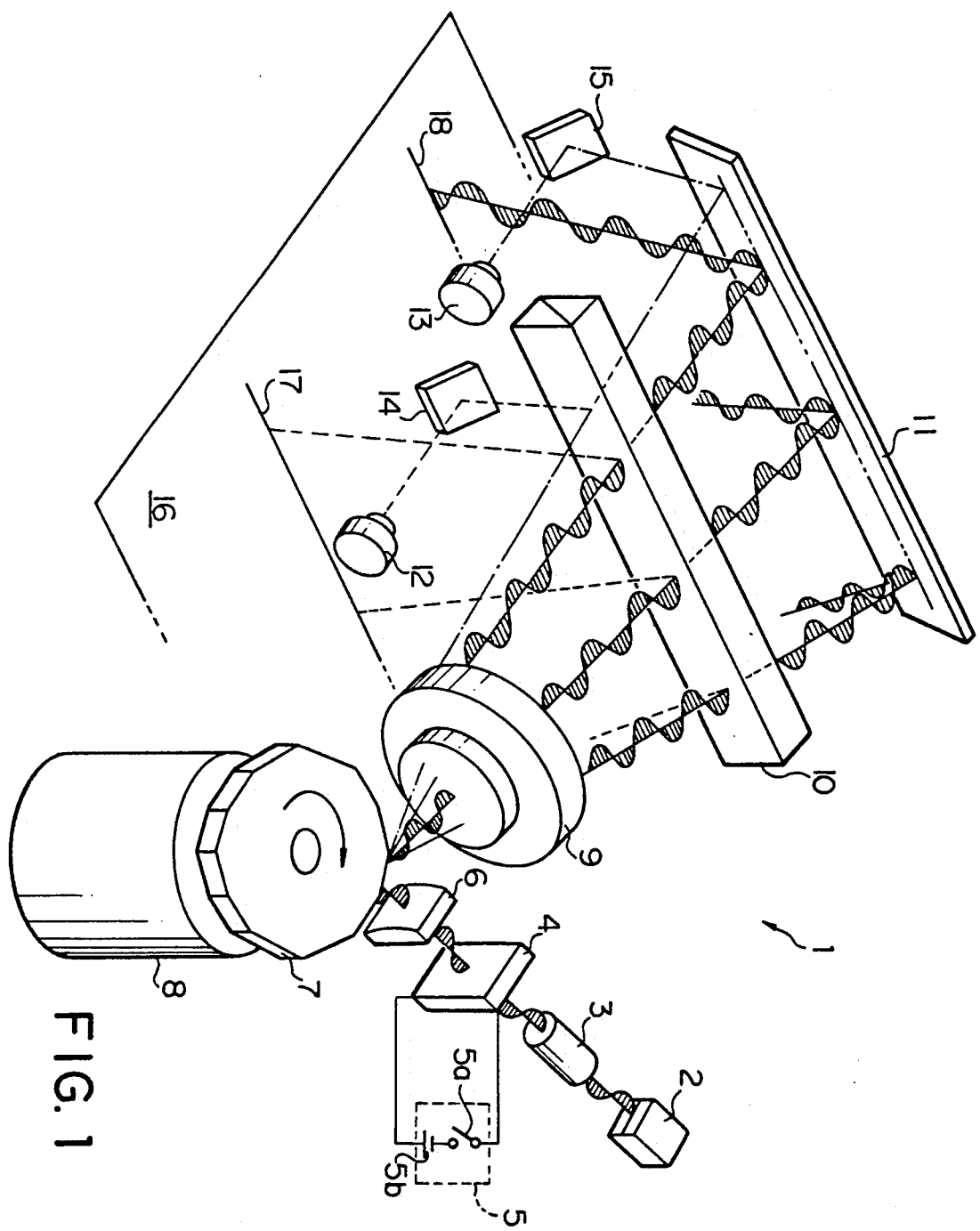
FIG. 1 is a perspective view showing the structure of a laser beam scanning system embodying the present invention.

Referring first to FIG. 1 of the drawings, a scanning system according to the present invention comprises a semiconductor laser generating element 2 serving as a laser beam source, collimator lens unit 3, a PLZT element 4 formed of, for example, $[(Pb_{1-x},La_x)(Zr_{1-y},Ti_y)O_3]$ and associated with a biasing circuit 5, cylindrical lens unit 6, a polygonal mirror 7 coupled to a driving motor unit 8 for rotation thereof, a scanning lens unit 9 (which is referred to as f0 lens), a polarization beam splitter 10, a reflective mirror 11, photo detectors 12 and 13 respectively associated with the polarization beam splitter 10 and the reflective mirror 11 for detecting the scanning laser beams at the starting points, and associative mirrors 14 and 15 for directing the scanning laser beams to the photo detectors 12 and 13, respectively. The biasing circuit 5 is implemented by a series combination of a switching element 5a and a source of voltage 5b.

The semiconductor laser beam generating element 2 is a double heterojunction diode, and the laser beam radiated from the element 2 is an ellipse in cross section and confined in a certain area. The laser beam is linearly polarized in a direction parallel to the junctions of the semiconductor laser generating element 2. The laser beam passes through the collimator lens unit 3 which causes the laser beam to be a bundle of parallel rays with an ellipse cross section. The bundle of parallel rays in turn passes through the PLZT element 4, and the PLZT element 4 serves as an electro-optical means together with the biasing circuit 5. The cylindrical lens unit 6 focuses the incident rays upon one of the reflective surfaces of the polygonal mirror 7.

By the way, the PLZT element 4 has advantageous electro-optic characteristics such as a prompt response time period. The PLZT element 4 is transparent to the incident rays without any variation of the polarized direction in the absence of any biasing voltage, however, the polarized direction of the incident rays rotates over 90 degrees in the presence of a biasing voltage applied to the PLZT element 4. While the switching element 5a is open as shown in FIG. 1, no rotation takes place in the polarized direction of the incident rays.

The bundle of the parallel rays thus passing through the PLZT element 4 as well as the cylindrical lens unit 6 reaches the reflective surface of the polygonal mirror 7 without any rotation in the polarized direction. Since the polygonal mirror 7 is driven for rotation by the driving motor unit 8, the laser beam or the bundle of parallel rays laterally sweeps at a constant angular velocity with the rotation of the polygonal mirror 7, and the laser beam is directed to the scanning lens unit 9. The scanning lens unit 9 is operative to regulate the liner velocity of the sweeping motion for achievement of a constant liner velocity. The laser beam thus regulated is incident onto the polarization beam splitter 10. The polarization beam splitter 10 is transparent to incident rays polarized in a direction parallel to the junctions of the semiconductor laser beam generating element 2, but deflects incident rays polarized in a direction perpendicular to the junctions. In this instance, the polarization beam splitter 10 is of the Glan-type polarization beam splitter, because the Glan type polarization beam splitter is large in the separation angle. A small deviation of the transmitted ray is another attractive point of the Glan-type polarization beam splitter.

Since the laser beam shown in FIG. 1 is polarized in a direction parallel to the junctions without any biasing voltage applied to the PLZT element 4, the laser beam is transmitted to the reflective mirror 11 without any deflection, and is guided onto a laser beam receiving station 16. The laser spot traces a scanning path 17 on the laser beam receiving station 16.

Figure 2:
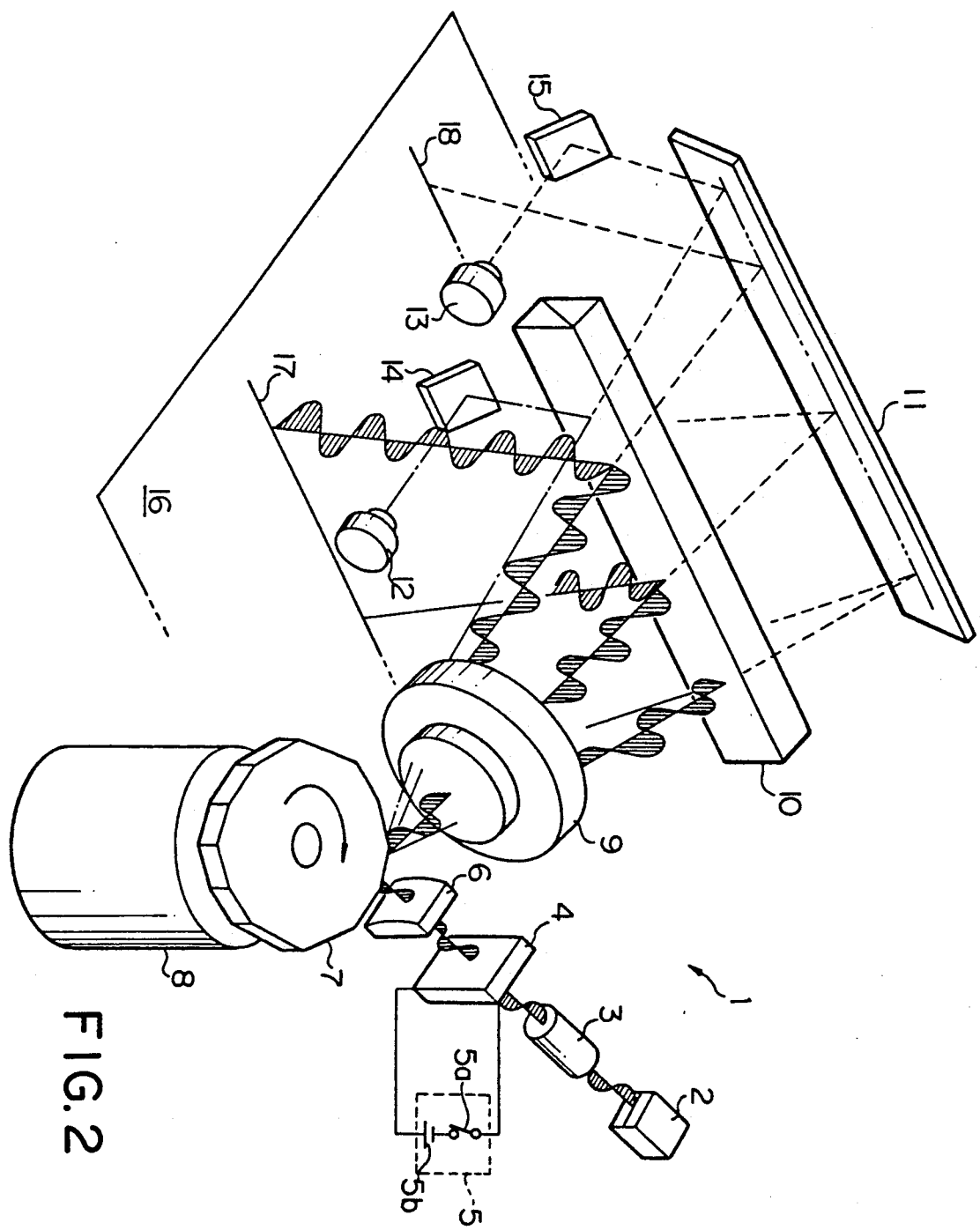
FIG. 2 is a perspective view showing another operational condition of the laser beam scanning system shown in FIG. 1.

However, a biasing voltage level is applied to the PLZT element 4, the polarized direction rotates over 90 degrees, and, for this reason, the laser beam is polarized in the direction perpendicular to the junctions as shown in FIG. 2. The laser beam thus polarized is deflected by the polarization beam splitter 10, and is, then, directed onto the laser beam receiving station 16. Since the laser beam is deflected by the splitter 10, a scanning path 18 of the laser spot is deviated from the path 17.

As will be understood from the foregoing description, the laser beam is deflected by the polarization beam splitter 10 or transmitted therethrough depending upon the biasing voltage level, so that the optical path of the laser beam is momentarily varied by shifting the switching element 5a.

The photo detectors 12 and 13 are operative to detect the respective starting points of the scanning paths 17 and 18, and the starting points are liable to fluctuate due to misalignments of the reflective surfaces of the polygonal mirror 7. The photo detectors 12 and 13 are provided at respective positions equivalent to the surface 16. When detecting the respective laser beams, the photo detectors 12 and 13 respectively produce control signals, and the switching element 5a is alternated between the on and off states upon application of each control signal. As described hereinbefore, the PLZT element 4 causes the polarized direction of the laser beam to rotate over 90 degrees, and, for this reason, the laser beam alternatively traces the scanning paths 17 and 18. While the laser beam is fallen upon one of the reflective surfaces of the polygonal mirror 7, the laser spot traces either scanning path 17 or 18; however, the laser spot returns to the starting point at the edge of the subsequent reflective surface. The photo detector 12 or 13 detects the laser spot and produces the control signal, so that the scanning path is rapidly changed by the PLZT element 4. If the laser beam is modulated in accordance with a bit map memorized in a memory unit (not shown), an image is formed on the station 16 with the laser beam which behaves as if two laser beams were produced.

In this instance, the scanning paths 17 and 18 are associated with the respective photo detectors 12 and 13. However, if a single photo detector is disposed within the moving range in front of the beam splitter 9, the sweeping motion of the laser beam is detectable with the single photo detector.

Figure 3:
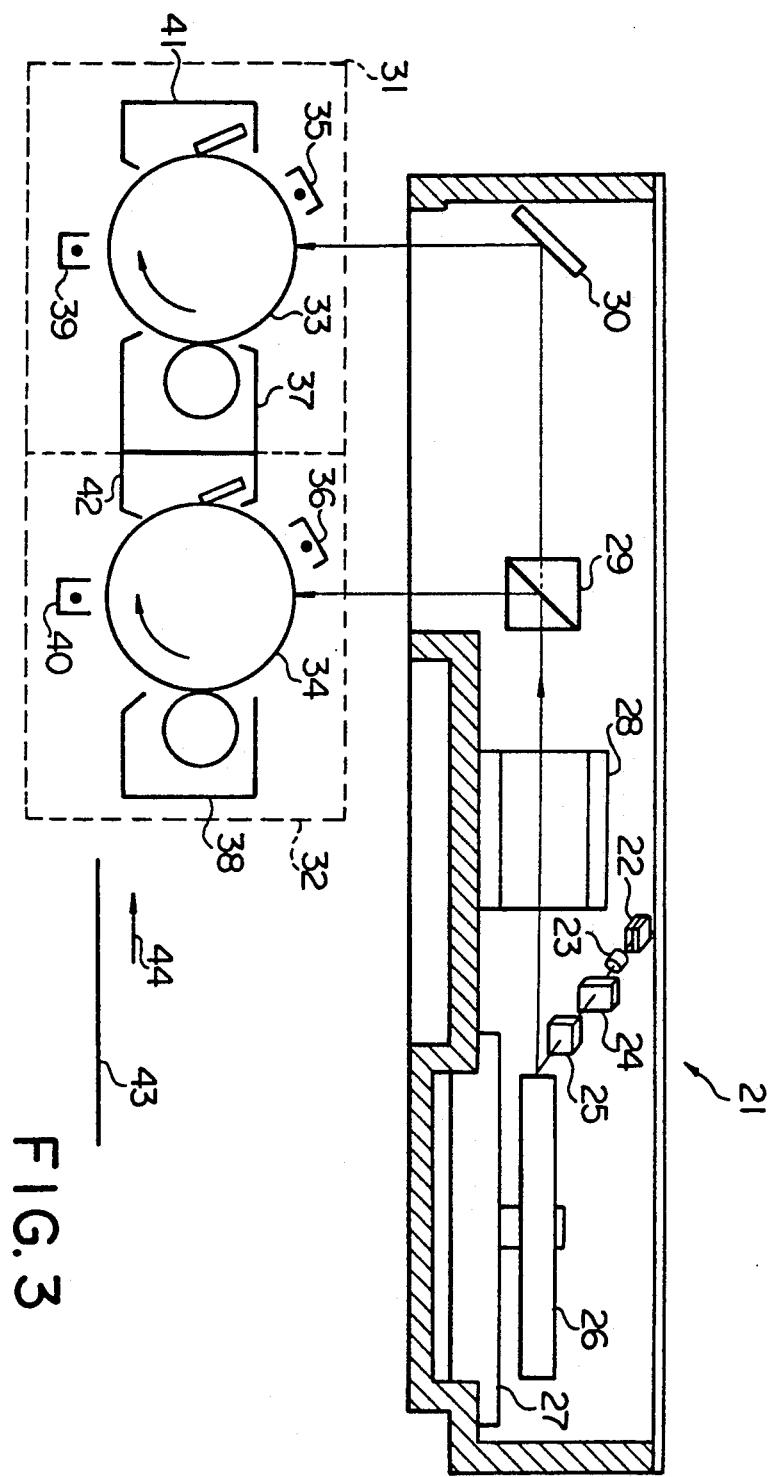
FIG. 3 is a cross sectional view showing the structure of a multiple color printer equipped with the laser beam scanning system according to the present invention.

If the laser beam scanning system according to the present invention is incorporated in an electronic photosystem, a multiple color printer is implemented as shown in FIG. 3. Referring to FIG. 3, the multiple color printer 21 comprises a single semiconductor laser beam generating device 22, a collimator lens unit 23, PLZT element 24 associated with a biasing circuit, a cylindrical lens unit 25, a polygonal mirror 26 coupled to a driving motor 27, a scanning lens unit or an f0 lens 28, a polarization beam splitter 29, a reflective mirror 30, a first electronic image forming unit 31 for a black toner and a second electronic image forming unit 32 for a red toner. Each of the electronic image forming units 31 or 32 comprises a photo-sensitive drum 33 or 34, and an electric charger 35 or 36, an image developer 37 or 38, an image transfer charger 39 or 40 and a cleaner 41 or 42 are arranged around the photo-sensitive drum 33 or 34.

A laser beam radiated from the signal semiconductor laser beam generating device 22 is incident into the collimator lens 23, and the collimator lens 23 causes the laser beam to be a bundle of parallel rays. The bundle of parallel rays or the laser beam is transmitted through the PLZT element 24. Though not shown in the drawings, photo detectors are provided as similar to the laser beam scanning system shown in FIGS. 1 and 2 for shifting the polarized direction of the laser beam, so that the polarized direction rotates over 90 degrees upon application of a control signal supplied from the photo detector. The laser beam with one polarized direction is reflected along one of the reflective surfaces of the polygonal mirror 26, and passes through the scanning lens unit 28 as well as the polarization beam splitter 29, then is reflected on the mirror 30 toward the first photo-sensitive drum 33 or first laser beam receiving station. However, the laser beam with the other polarized direction is reflected along the subsequent reflective surface of the polygonal mirror 26, and is deflected toward the second photo-sensitive drum 34 or second laser beam receiving station by the polarization beam splitter 29. The semiconductor laser beam generating device 22 is associated with data buffers (not shown) which temporally memorize a group of data bits for the black toner and a group of data bits for the red toner, respectively, and the laser beam is modulated with those two kinds of data bits. Every data bit group is read out in every single scanning with the laser beam. Namely, the laser beam directed onto the first photo-sensitive drum 33 is modulated with the data bits for the black toner, and the laser beam guided to the second photo-sensitive drum 34 carries data information represented by the data bits for the red toner. As a result, latent images are respectively formed on the photo-sensitive drums 33 and 34, and are developed by the developing unit 37 and 38, respectively. A paper 43 is conveyed in the direction indicated by an arrow 44, and a red image and, subsequently, a black image are transferred onto the paper 43. Thus, a multiple-color image is reproduced on the paper 43.

Although particular embodiments of the present invention have been shown and described, it will be obvious to those skilled in the art that various changes and modifications may be made without departing from the spirit and scope of the present invention. For example, the semiconductor laser beam generating device may be replaced with any laser beam source such as a solid laser generating unit in so far as the laser beam is linearly polarized. The number of laser beam source may be greater than 1, and such an implementation can distribute two laser beams to four destinations.

Moreover, the PLZT element is replaceable with another element such as, for example, a liquid crystal film in so far as the element achieves electrooptic effects or magnetooptic effects for electrically or magnetically controlling the incident rays. The liquid crystal film is associated with a biasing circuit. If a ½ wave plate is used in association with a controlling mechanism, the polarized direction of the transmitted ray is rotated at 90 degrees with respect to the incident ray. However, the PLZT element and the liquid crystal film are quickly responsive to alternation, and are advantageous over the ½ wave plate.

The multiple color printer shown in FIG. 3 reproduces the multiple color image by using the laser beam deflected between the two scanning paths, and the data bits for black toner and the data bits for the red toner are memorized in the data buffers dedicated thereto, respectively. However, if ever data bit group for the black toner is interposed between two groups of the data bits for the red toner, all of the data bits are memorized in a bit map memory, and are sequentially read out therefrom.

The laser beam scanning system is further applicable to a single color high density printer. In this application, every lateral area along the scanning path is divided into two sub-lateral areas, and one of the sub-areas is traced with the laser beam deflected from the beam splitter 29, but the other sub-area with the laser beam reflected from the mirror 30. Thus, every pixel of the latent image is as small in area as a half of the ordinary pixel, and, for this reason, a high density image is reproduced by such a printer.

What is claimed is:

1. A laser beam scanning system comprising:
    laser beam generating means for generating a laser light beam which is linearly polarized;
    electro-optical means for selectively varying or not varying the polarized direction of the laser light beam generated from said laser beam generating means;
    a first beam receiving station;
    a second beam receiving station;
    scanning means for scanning the first and second beam receiving stations with the laser light beam after it has passed through said electro-optical means, and
    means for directing the laser light beam of which the polarized direction has been varied by said electro-optical means to said first beam receiving station and for directing the laser light beam of which the polarized direction has not been varied to said second beam receiving station.

2. A laser beam scanning system as set forth in claim 1, in which said laser beam generating means is implemented by a single semiconductor laser beam generating device.

3. A laser beam scanning system as set forth in claim 2, in which said laser beam generating device is of a double heterojunction type.

4. A laser beam scanning system as set forth in claim 1, in which said electro-optical means is implemented by a PLZT element associated with a biasing circuit.

5. A laser beam scanning system as set forth in claim 1, in which said scanning means comprizes a rotatable polygonal mirror.

6. A laser beam scanning system as set forth in claim 1, in which said means for directing the laser beam comprises a polarization beam splitter.

7. A laser beam scanning means comprising,
    a laser diode for generating an original laser light beam having a specific polarized direction,
    an electro-optical element for selectively converting said original laser light beam to a polarized laser light beam which has a polarized direction rotated from said specific polarized direction by 90 degrees,
    a rotational polygonal mirror for reflecting the original and polarized laser light beam toward first and second beam receiving stations, and
    an optical member for directing the polarized laser light beam to the first beam receiving station and for directing the original laser light beam to the second laser beam receiving station.

8. A method for scanning first and second laser beam receiving stations with a laser means, the steps comprising,
    generating an original laser light beam having a specific polarized directions,
    selectively converting said original laser light beam to a polarized laser light beam having a polarized direction varied from said specific polarized direction,
    directing said polarized laser light beam to the first beam receiving station in order to scan there, and
    directing said original laser light beam to the second laser beam receiving station in order to scan there.

9. In a laser beam scanning system which scans a beam receiving surface, the improvement comprising:
    means for generating a beam having a specific polarized direction;
    means for varying the polarized direction of the laser light beam; and means for directing the laser light beam towards one of two separate directions according to the polarized direction thereof.

10. In a multiple color laser printer, the improvement comprising:

means for generating a linearly polarized laser light beam from a single laser source;

means for selectively varying the polarized direction of the laser light beam generated from the single laser source to a direction distinctly different from its original orientation;

a first electronic image forming unit for providing a first color image;

a second electronic image forming unit for providing a second color image of a color different than the first color image;

means for successively transporting copy paper to the first and second electronic image forming units to receive the respective first and second color images;

means for scanning the polarized laser light beam, and means for directing the scanning polarized laser light beam to, respectively, the first electronic image forming unit or the second electronic image forming unit, depending upon the specific polarization direction of the laser light beam.

* * * * *